(12) United States Patent
Amerson et al.

(10) Patent No.: US 6,812,402 B1
(45) Date of Patent: Nov. 2, 2004

(54) APPARATUS FOR SECURING ELECTRICAL WIRING TO A DEVICE

(75) Inventors: Randall J. Amerson, Spring Grove, IL (US); Wolfgang Huber, Cham (CH)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 0 days.

(21) Appl. No.: 10/669,191

(22) Filed: Sep. 24, 2003

(51) Int. Cl.[7] ................................................. H02G 3/10
(52) U.S. Cl. ........................ 174/48; 174/68.1; 52/220.1
(58) Field of Search ................. 174/48, 68.1, 68.3, 174/169; 52/220.7, 220.1; 248/62, 74.4; 439/207, 210

(56) References Cited

U.S. PATENT DOCUMENTS

| | | | | |
|---|---|---|---|---|
| 3,437,742 A | * | 4/1969 | Lindsey ...................... | 174/169 |
| 3,836,102 A | * | 9/1974 | Hall .......................... | 248/74.4 |
| 5,380,951 A | * | 1/1995 | Comerci et al. .............. | 174/48 |
| 5,573,321 A | * | 11/1996 | Bell, Jr. ...................... | 312/242 |
| 5,693,908 A | * | 12/1997 | Amberger .................... | 174/48 |
| 6,329,591 B2 | * | 12/2001 | Karst et al. ................... | 174/48 |
| 6,362,422 B1 | * | 3/2002 | Vavrik et al. ................. | 174/50 |

* cited by examiner

*Primary Examiner*—Dhiru R. Patel (57) ABSTRACT

The present invention relates to a system and method for securing wiring to a device housing. The device housing is provided with a base capable of securing different types of wiring. A reversible clamp strap is provided that may be used to further provide for the securing of different types of conductors into the device housing.

26 Claims, 6 Drawing Sheets

APPARATUS FOR SECURING ELECTRICAL WIRING TO A DEVICE

BACKGROUND OF THE INVENTION

Installation of devices into a control system requires wires be connected between the devices and the control system the devices communicate with. The wires supply power and provide for signal generation between the control system and the devices. In these control applications wiring is generally accomplished via one of two methods: insulated wire contained inflexible metal conduit, or by using insulated plenum cable. In either case, the attachment of the flexible metal conduit or the unprotected plenum cable must be secure enough to prevent the power or control signal wires from being accidentally dislodged from wiring terminals.

Flexible metal conduit is usually attached to an electrical housing or enclosure with adapter fittings purchased from an outside supply source. These fittings must be ordered, made available, and require labor to affix them to the housing (or enclosure) and to the flexible metal conduit. The strain-relief for plenum cable (which is somewhat similar to small-diameter to appliance cord) is accomplished via any number of schemes to prevent the protective outer jacket from being displaced or moved relative to the device housing when subjected to moderate pull force. Common methods for providing plenum cable strain-relief may include a maze or labyrinth of pins or barriers internal to the housing of the device which the cable must be threaded through to provide the necessary friction or clamping force against the cable. The problem with such methods is that they necessitate unnecessary procurement, cost and labor, and require too much internal space to provide plenum cable strain relief.

SUMMARY OF THE INVENTION

The present invention provides an improved design for securing electrical conductors such as, but not limited to, metal conduit or plenum cable into device housings. This is accomplished via a reversible clamp-strap which can be installed in two different orientations. The first orientation is for affixing flexible metal conduit. The second orientation provides for plenum cable strain-relief. Both orientations basically provide clamping pressure against either the flexible metal conduit or the plenum cable outer jacket. For the flexible metal conduit application, positive retention of the conduit is enhanced by the lanced tabs of the clamp strap which key to the spiral seam of the conduit, and by the actual deformation of the clamp strap itself. Such deformation is controlled by the design gap between screw towers (provided on the base of the device housing) and the clamp strap prior to tightening the screws, which secure the clamp-strap to the screw towers. Plenum cable strain-relief is enhanced by raised grip bars which are internally molded features of the base. The grip bars further secure the outer jacket of the plenum cable as the clamp strap is pressed against it.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION OF EXEMPLARY EMBODIMENTS

Figure 1:
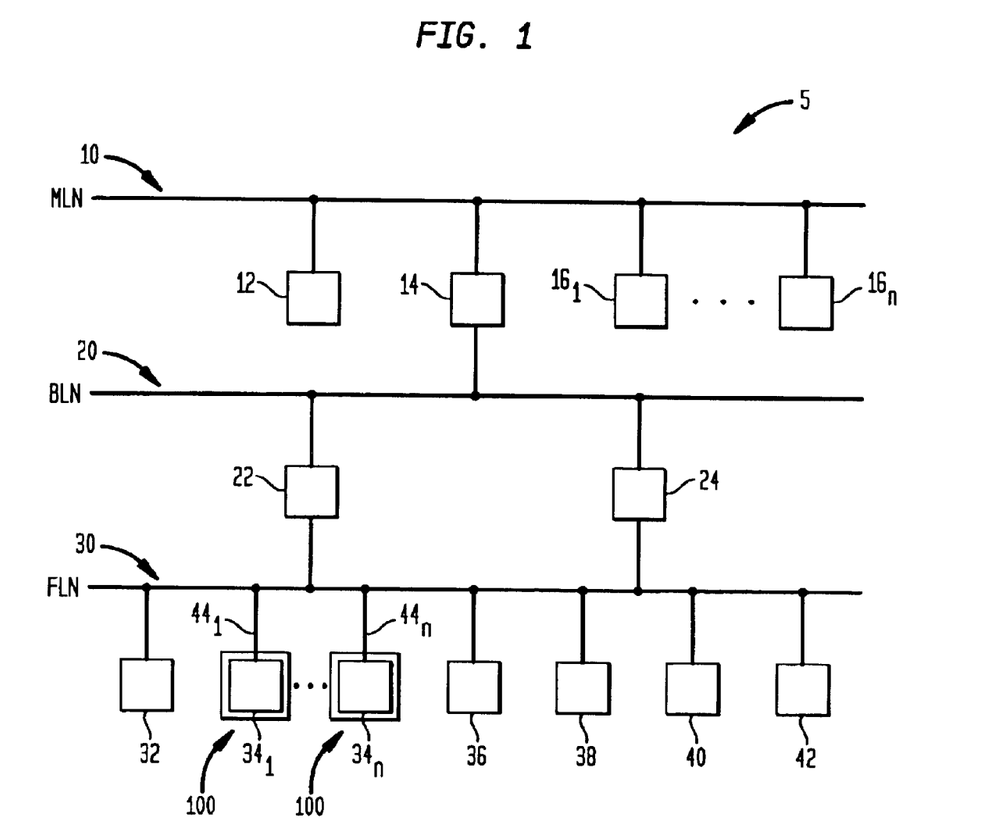
FIG. 1 is a schematic diagram of an exemplary facility management system in which the present invention is implemented.

In FIG. 1 is illustrated an exemplary system for implementing the teachings of the present invention. The network architecture of the facility management system 5 of the present invention is preferably comprised of three levels, a management level network (MLN) 10, which is an Ethernet network based on Transmission Control Protocol/Internet Protocol, commonly known as TCP/IP protocol, a building level network (BLN) 20, and a floor level network (FLN) 30. Low level or floor level networks (e.g. FLN 30) are typically small deterministic networks with limited flexibility or bandwidth, but which provide for control data communication between locally controlled devices. Building level networks (e.g. BLN 20) are medium level networks that are the backbone of the building control system 5. A building level network typically connects to several floor level networks and possibly large equipment, and further is connected to the control stations that allow for monitoring of all system data. As a result, the building level network 20 in the embodiment described herein is a token ring network. The management level network 10 is a high level network used for interfacing with internal and external workstations, data repositories, and printing devices. The management level network 10 in the exemplary embodiment described herein is an open protocol network (e.g. Ethernet) that enables remote access to data within the system 5.

The building level network is responsible for relaying data throughout the building control elements (i.e. ventilation damper controllers, chiller plant controllers, temperature sensors, alarm systems)

Connected to the MLN 10 is a report server 12, an building automation server 14, such as an APOGEE® building control system, and at least one building automation client 16—16. Server 14 provides overall control of the facility management system 5 and includes a user interface. The MLN 10 may also suitably employ BACnet, XML and/or other protocols that support high speed data communications. The MLN 10 may connect to other supervisory computers, Internet gateways, or other gateways to other external devices, as well as additional network managers (which in turn connect to more subsystems via additional low level data networks). While FIG. 1 shows a report server 12 and a building automation server 14, one server capable of providing the functions of servers 12 and 14 may be sufficient to meet the requirements of the present invention.

The BLN 20 is comprised of at least one peer-to-peer modular building controller (MBC) 22 and at least one modular equipment controller (MEC) 24. MBC 22 is a modular, programmable primary controller with a supervisory interface capability to monitor a secondary controller network. The MBC 24 is designed to control general HVAC applications including air-handling units, chillers/boiler/central plant control and distribution systems, data acquisition, and other multi-equipment applications. The MBC 24 provides on-board control of I/O points and central monitoring for distributed secondary control units and other building systems (e.g. fire/life safety, security, and lighting). Each MBC 24 may control up to 96 floor level devices. Comprehensive alarm management, historical trend collection, operator control and monitoring functions are integral to the MEC 22.

Controllers 22, 24, residing on the peer to peer building level network 20, are connected to the Ethernet network without the use of a PC or a gateway with a hard drive. Any PC on the MLN 10 will have transparent communication with controllers 22 and 24 on the building level network 20 connected via Ethernet, as well as, directly connected building level networks.

Floor level devices connected to the FLN 30 may include terminal equipment controllers 32, one or more sensors 34, differential pressure monitors 36, fume hood control monitors 38, lab room controllers, digital energy monitors 40, variable frequency drives 42 and other devices. The FLN 30 may suitably employ the standardized LonTalk protocol. Controller 22 or controller 24 serve to coordinate the communication of data and control signals between the elements on the FLN 32, 34, 36, 38, 40, 42 and the servers 12 and 14. In order to operatively connect any of the devices connected to the FLN 20 (e.g. sensors $34_1$–$34_n$) electrical conductors $44_1$–$44_n$ are required. The present invention provides for securing conductors $44_1$–$44_n$ n to device housings of devices located on the FLN 20, such as sensors $34_1$–$34_n$ which are each provided in a device housing 100 further described in FIG. 2.

Figure 2:
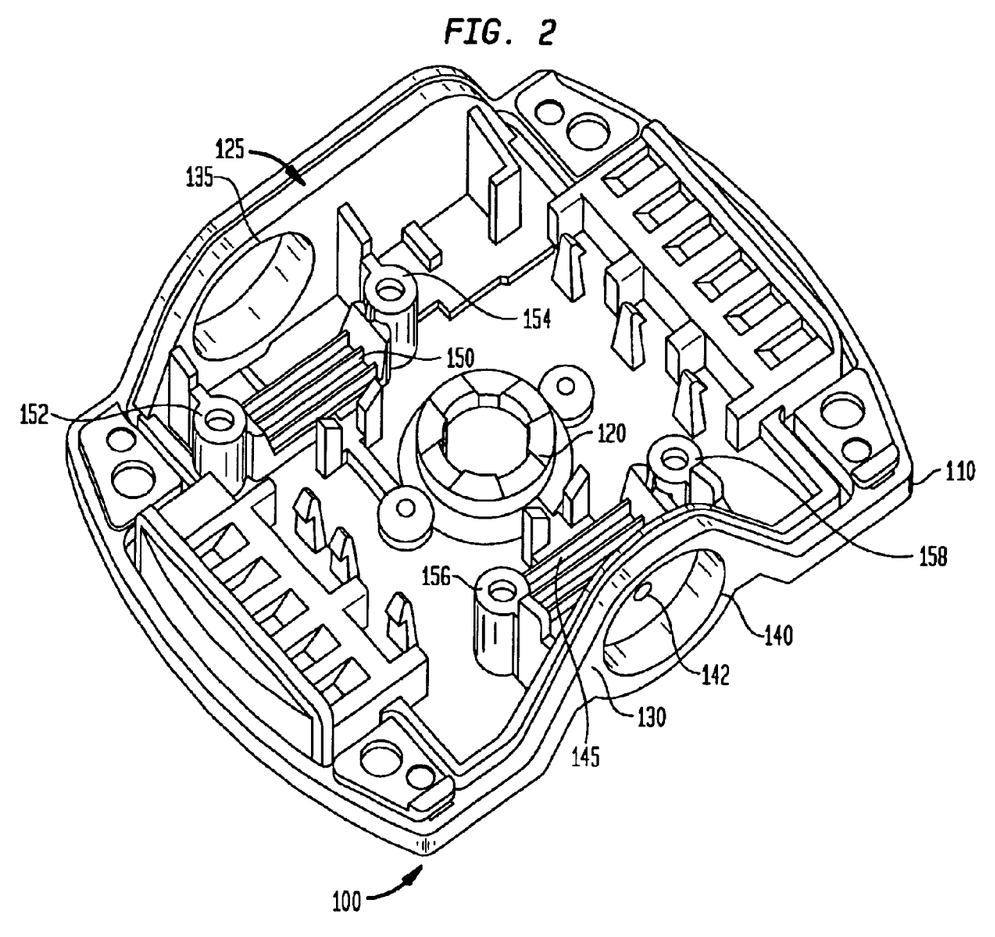
FIG. 2 is an elevated view of the present invention showing the base of the device housing before devices and conductors are attached.

FIG. 2 of the present invention shows a device housing 100 that allows for more secure connections between conductors $44_1$–$44_n$ and sensors $34_1$–$34_n$. While FIG. 2 shows a device housing to be used with the system shown in FIG. 1, the device housing of FIG. 2 can be used with varying types of systems requiring secure wiring connections. Device housing 100 comprises a base 110. Base 110 is provided with sensor interface 120 for receiving varying types of sensors, such as temperature sensors, relative humidity sensors and carbon dioxide sensors Base 110 is provided with side walls 125 and 130, which are provided with apertures 135, 140 for receiving electrical conductors which can be connected to a sensor (not shown) inserted in sensor interface 120. As shown in FIG. 2, aperture 140 is closed by a knock-out element 142. In a preferred embodiment, all of the openings 120, 135 and 140 are dosed by knock-outs. These knock-outs (e.g. knock-out element 142) are selectively removed either during further assembly of the complete device or when it is installed by the "end user". The knock-outs, such as knock-out element 142, may be provided since it is desirable in some applications to have the device housing 100 sealed against the outside environment. The advantage of having apertures 135 and 140 on opposite sides of base 110 is that this configuration allows a user to pass conductors 44 then the housing 100 and continue the conductors 44 on to another type of device.

Still referring to FIG. 2, the base 110 is provided with grip bars 145 adjacent to aperture 135 and grip bars 150 adjacent to aperture 140 for providing plenum cable stress relief. Base 110 is further provided with screw towers 152, 154 which are provided on opposite sides of grip bars 150 and with screw towers 156 and 158 which are provided on opposite sides of grip bars 145. Screw towers 152, 154,156 and 158 are used to secure clamp-straps, which according to the present invention, are used to provide improved stability to the wiring connection between conductors $44_1$–$44_n$ and sensors $34$–$34_n$.

Figure 3:
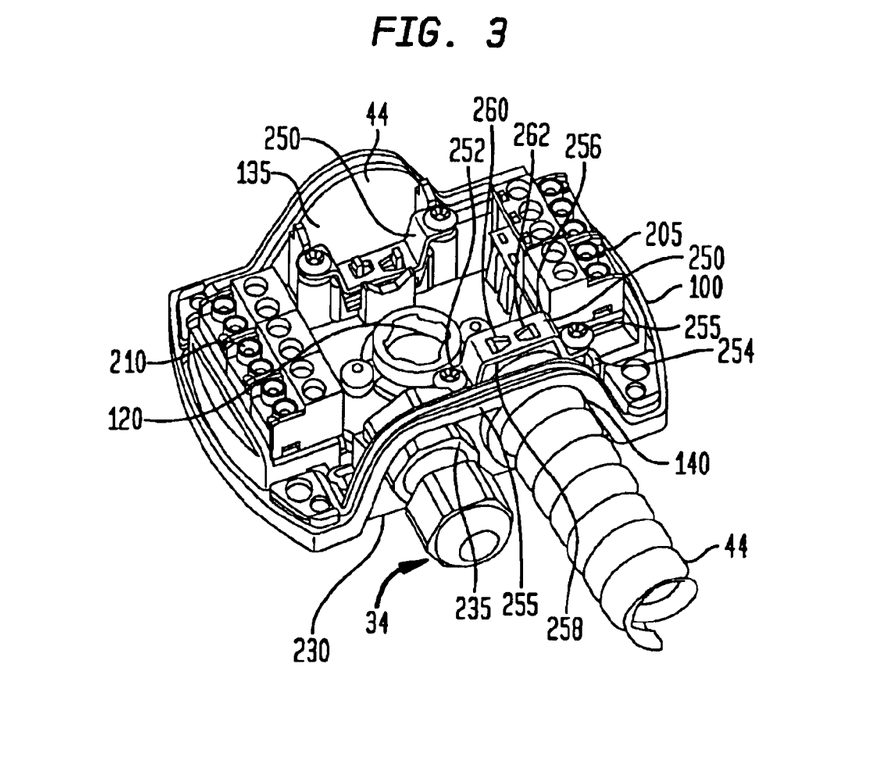
FIG. 3 is an elevated view of the present invention showing the base of the device after an electrical conductor has been secured to the base using the clamp-strap of the present invention.

FIG. 3 illustrates base 110 after terminal blocks 205, 210, sensor 34 and plenum cable 44 have been connected to the base 100. Sidewall 230 is similar to sidewall 130 of FIG. 2, except that sidewall 230 is provided with an aperture 235 for receiving sensor 34 and aperture 140 for receiving electrical conductor 44, which in FIG. 3 is illustrated as flexible metal conduit. Sensors 34 may interface physically either thru the opening 120 in the center of the base 110 or at the smaller side opening 235 provided in sidewall 230. Accordingly, base 110 is provided with two types of sensor interfaces 120, 235 which allow the user to install different types of devices (e.g. sensors) into the housing, or more than one type of device into the housing. Therefore, the present invention provides a housing 100 that can have plural sensor configurations. For example, depending upon the types of sensors 34 installed in housing 100, the device housing can provide for temperature, relative humidity or CO2 sensing, or some combination of these sensing capabilities.

Figure 6:
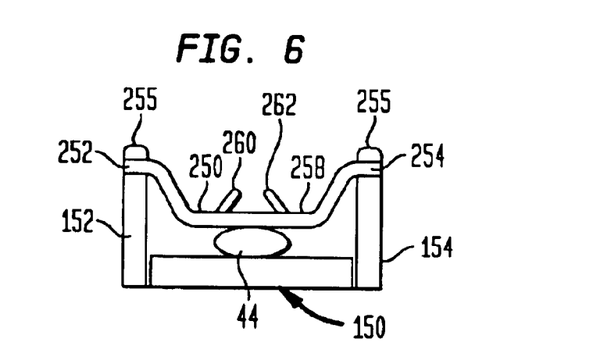
FIG. 6 is a side view of the present invention illustrating how the clamp strap of the present invention secures another type of electrical conductor after the conductor has been connected into a device housing.
Figure 7:
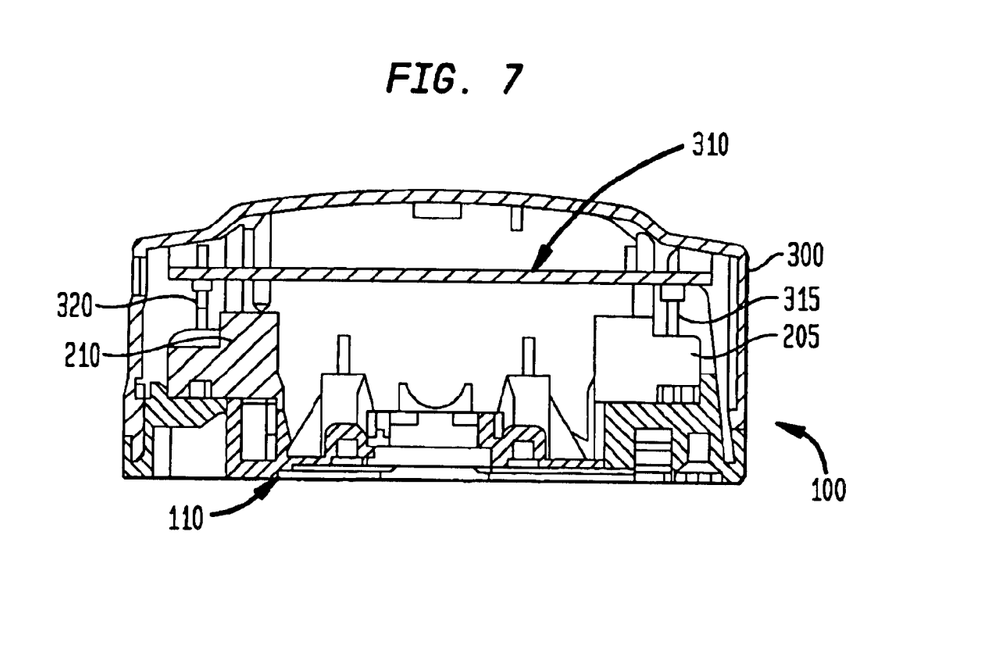
FIG. 7 is a side view of the device housing of the present invention after the cover has been connected to the base.

Referring still to FIG. 3, terminal blocks 205 and 210 snap into base 110 and receive wiring from one or more sensors 34, one or more conductors 44, and pin connections from a printed circuit board (not shown) provided in the cover of the housing 100, discussed with respect to FIG. 7. In order to secure an electrical conductor 44 to base 110, clamp-strap 250 is secured to the base 110. Clamp-strap 250 is provided with two ends 252 and 254 which are secured to screw towers 156 and 158 respectively using screws 255 to secure the electrical conductor 44. The clamp strap 250 has two sides 256 and 258. Side 258 is provided with lanced tabs 260, 262 which key to the spiral seam of the conductor 44 and secure the conductor 44 in place when conductor 44 is provided as conduit. Accordingly, as shown in FIGS. 5 and 6, and as discussed below with respect to FIG. 9, clamp strap 250 is reversible such that either side 256 or 258 may be used to secure a conductor 44 to housing 100 depending upon the type of conductor used.

Figure 4:
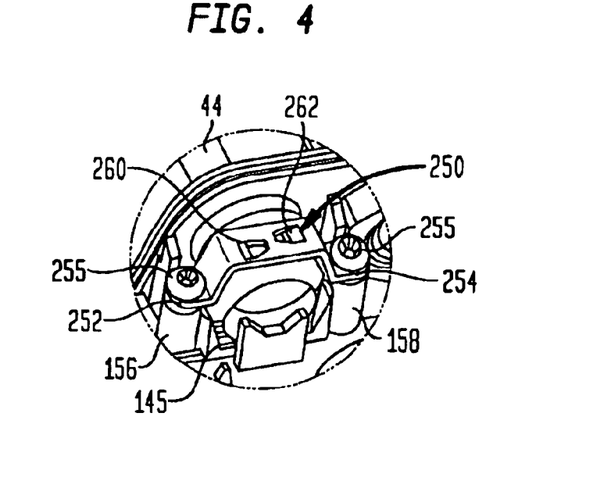
FIG. 4 is a partial view of the present invention illustrating how a clamp-strap is used to secure an electrical conductor.

FIG. 4 provides an alternative view of the invention shown in FIG. 3 and further illustrates how grip bars 145 and the clamp-strap 250, screwed into screw posts 156 and 158, secure the conductor 44 in place after it has been inserted through aperture 140 of base 110. Plenum cable strain-relief is enhanced by raised grip bars 145 which are integrally molded features of the base. The grip bars 145 bite into the outer jacket of the conductor 44 (e.g. plenum cable) as the clamp strap 250 is pressed against it. A controlled gap between the clamp strap 250 and the grip bars 145 is designed into the application to minimize damage to the plenum cable jacket when clamped in place. The conductor 44 is further held in place by the actual deformation of the clamp strap 250 itself, controlled by the design gap between the screw towers 156, 158 and the damp strap 250 prior to tightening the screws.

Turning again to FIG. 3, FIG. 3 further shows an alternative way in which clamp strap 250 may be used to secure a conductor 44. In situations where conductor 44 is insulated wire contained in flexible metal conduit, clamp strap 250 may be secured to screw posts 152 and 156 such that side 256 is used to secure conductor 44. After conductor 44 has been secured in place by clamp strap 250, the conductor 44 may be operatively connected to one of the terminal blocks 205, 210.

Figure 5:
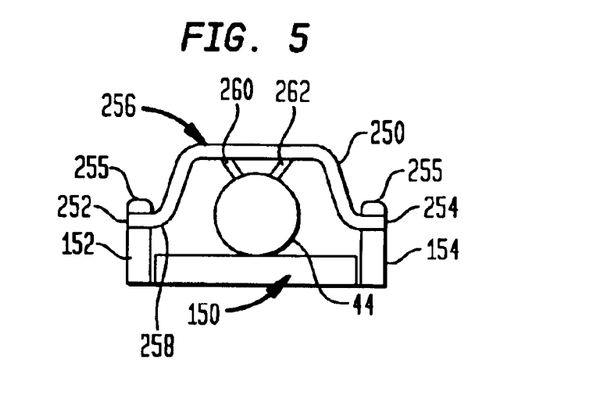
FIG. 5 is a side view of the present invention illustrating how a clamp strap of the present invention secures one type of electrical conductor after the conductor has been connected into a device housing.

FIGS. 5 and 6 are provided to illustrate how clamp strap 250 is used to secure an electrical conductor 44 to base 110. As shown in FIG. 5, when conductor 44 is flexible metal conduit, the clamp strap ends 252 and 254 are secured to screw posts 152 and 154 such that side 258 comprising a pair of lanced tabs 260, 262 is the side of the clamp strap that is used to secure the conductor 44 between the clamp strap 250 and grip bars 150. As shown in FIG. 5, the conductor 44 is further held in place by the actual deformation of the clamp strap 250 itself controlled by the design gap between the screw towers 152, 154 and the clamp strap 250 prior to tightening the screws.

As shown in FIG. 6, when conductor 44 is a plenum cable, the clamp strap ends 252 are secured to screw towers 152 and 154 such that side 256 is the side of the clamp strap that is used to secure the conductor 44 between the clamp strap 250 and grip bars 150. As FIG. 6 shows, lanced tabs 260 and 262 are not used to secure the conductor 44. Only the flat surface of side 256 is needed to secure the conductor 44.

FIG. 7 shows the device housing 100 of the present invention after the cover 300 has been attached to base 110. Connected to the cover 300 is printed circuit board 310. In the present invention, the cover 300 and its PCB 310 serve as a central platform for the whole family of sensor types. They provide a means of attaching the sensor 34 to a control system, such as control system 5 and provide the necessary electronic processing to provide the required control signal. The housing 100 could be physically mounted on or in pipes or in ductwork located in HVAC equipment rooms where the pumps, fans and other large central equipment is located, or they could be mounted on or in pipes or in ductwork in plenum areas i.e. above the false ceiling of most commercial buildings. When the cover 300 is secured to base 110, header pins 315, 320 located on the PCB 310 insert into the terminal strips of terminal blocks 205, 210 completing the control circuits.

Figure 8:
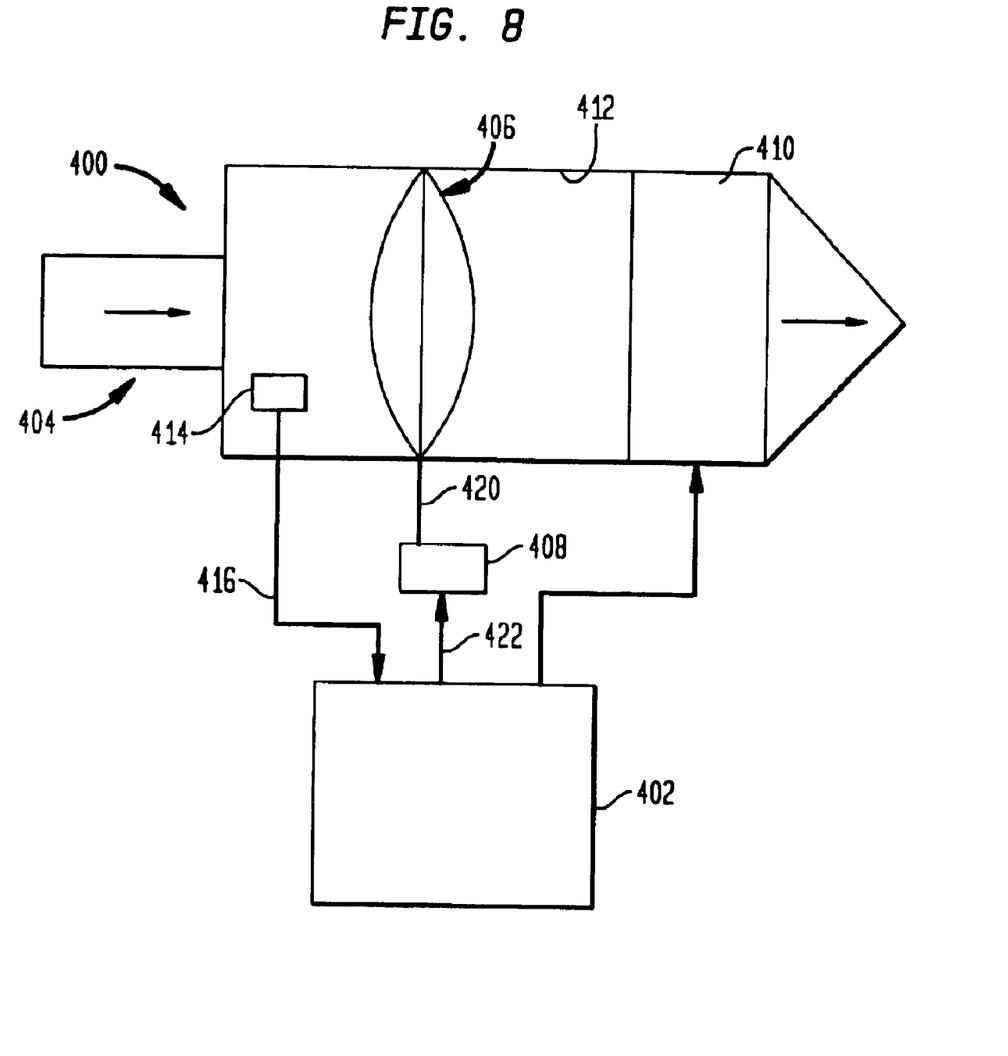
FIG. 8 is a schematic diagram of an exemplary VAV box in which the present invention is implemented.

FIG. 8 shows an alternative system in which the invention shown in FIGS. 2-7 can be implemented. As shown in FIG. 8, a variable-air-volume (VAV) box 400 is designed to maintain a relatively constant supply air temperature and deliver a variable amount of conditioned air into a controlled area of a facility to maintain the area at a desired temperature. VAV box 400 is preferably provided with a digital controller 402. The controller 402 is designed to control the quantity and temperature of the air which the VAV terminal unit discharges into the zone to meet the desired temperature and air quality of the zone.

The VAV terminal unit 400 has an air inlet 404 connected to a duct through which a supply air stream flows from a conventional air handling unit. A damper 406, operated by an actuator 408, physically controls the flow of supply air through VAV terminal unit. For example, the damper 406 may be adjusted to its minimum flow setting for ventilation if cooling is not required, and otherwise opened to a position that supplies the appropriate amount to cooled air to the building zone. When heat is needed, a box heating coil 410 is activated to warm the air flowing through chamber 412.

The controller 402 interacts with sensor 414, actuator 408 and heating coil 410 to control operation of the VAV box 400. Using the present invention, sensor 414 can be provided in a sensor housing as shown in FIGS. 2-7 such that electrical conductor 416 can be more securely connected to sensor 414. Further, actuator 408 can be provided within a housing larger than the housings shown in FIGS. 2-7, but such a housing can be provided with the same features set out in FIGS. 2-7 such that the electrical conductors 420 and 422 can be securely connected to the actuator 408.

Figure 9:
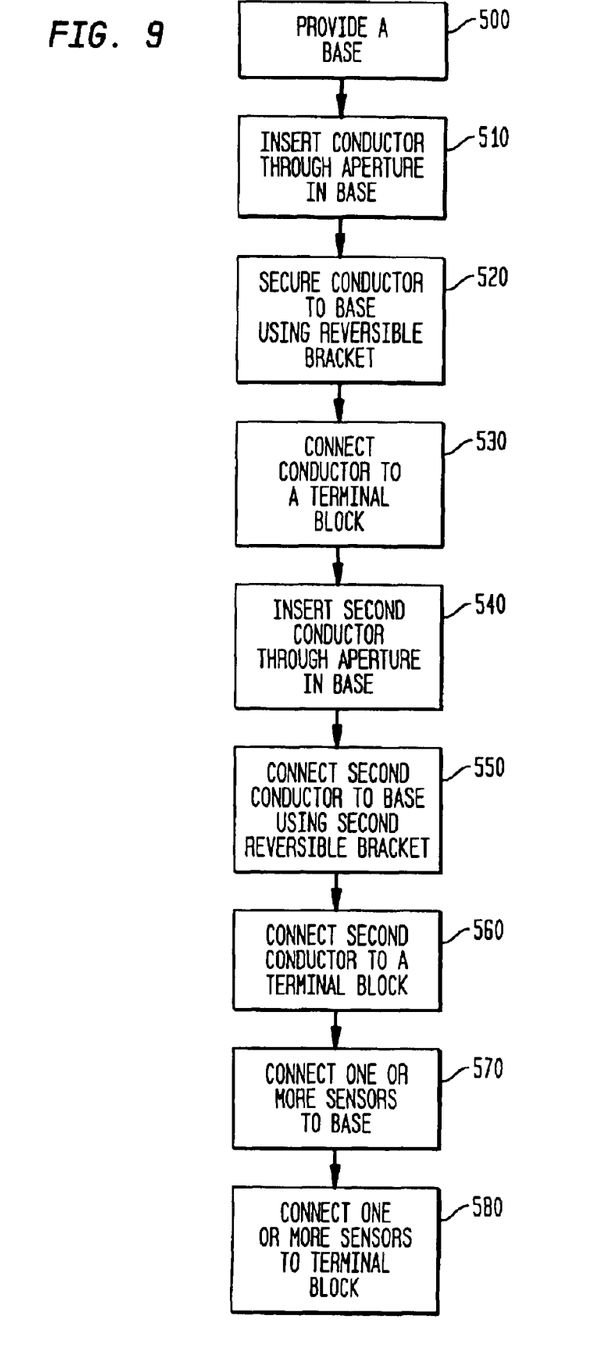
FIG. 9 is a block diagram illustrating a method of securing one or more electrical conductors to a device housing according to the present invention

The method of the present invention for connecting and securing a conductor 44 to a base 110 is shown in FIG. 9. According to the present invention, a base 110 is provided with apertures 135 and 140 in sidewalls 125, 130, or 230 for receiving electrical conductors 44 (block 500). One or more electrical conductors 44 may then be inserted through apertures 125, 130 or 230 (block 510). With respect to FIGS. 2-7, the electrical conductor 44 may then be secured to base 110 using either side 256 or side 258 of reversible clamp strap 250 (block 520). The conductor 44 can then be connected to one of terminal blocks 205 or 210 (block 530). In one embodiment, the user may then insert a second conductor 44 through the aperture 135 or 140 not being used by the first conductor 44 (block 540), though it is understood in some embodiments only one electrical conductor 44 will be secured to base 110. With respect to FIGS. 2-7, the second conductor 44 may then be secured to the base 110 using either side 256 or 258 of a second reversible clamp strap 250 (block 550). The second conductor 44 can then be connected to one of the terminal blocks 205 or 210 (block 560). After at least one conductor 44 is secured to the base 44, one or more sensors 34 may be connected to base 110, as discussed with respect to FIGS. 2-7 (block 570). The sensor or sensors 34 may be then connected to terminal blocks 205 or 210 (block 580). While FIG. 9 illustrates the preferred method for securing electrical conductors 44 and devices such as sensors 34 to base 110, it is understood in an alternative embodiment a user may wish to connect the sensors 34 to the base 110 before one or more conductors 44 are secured to the base 110 by a corresponding number of reversible clamp straps 250.

While the present invention has been illustrated by the description of exemplary processes and system components, and while the various processes and components have been described in considerable detail, applicants do not intend to restrict or in any way limit the scope of the appended claims to such detail. For example, the manner in which electrical conductors are secured as shown in FIGS. 2-7 can be used with various base, housing and device configurations. Further, while the electrical conductors discussed herein are plenum cable and conduit, the present invention can be readily applied to other types of electrical conductors. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicants' general inventive concept.

What is claimed is:

1. A housing for a device comprising:
   a base capable of securing a device in said housing;
   an opening for receiving an electrical conductor, said electrical conductor being operably connected to said device;
   a clamp-strap, comprising a first side having a raised surface and a second side, connected to said base for securing said electrical conductor after said electrical conductor has been connected to said device; wherein said first side of said clamp-strap is used for securing a first type of electrical conductor wherein said clamp-strap is reversible to enable said second side to contact and secure a second type of electrical conductor.

2. The housing according to claim 1, further comprising a pair of posts connected to said base for securing said clamp-strap to said base.

3. The housing according to claim 1, wherein said device is a sensor.

4. The housing according to claim 1, further comprising an interface in said base for connecting a device to said housing.

5. The housing according to claim 1, wherein said second side of said clamp-strap is used to secure said second type of electrical conductor to said base before said second type of conductor has been operatively connected to said device.

6. The housing according to claim 1, wherein said first side of said clamp-strap is used to secure flexible metal conduit to said device.

7. The housing according to claim 1, wherein said raised surface of said clamp-strap is comprised of lanced tabs for securing said first type of electrical conductor.

8. The housing according to claim 1, wherein said base further comprises one or more raised grip pads, wherein an electrical conductor connected to said device is secured between said clamp-strap and said one or more grip pads.

9. The housing according to claim 8, wherein a predetermined gap is provided between the clamp-strap and the grip pads to prevent damage to said electrical conductor when said clamp-strap is secured in place.

10. The housing according to claim 1, wherein said base is provided with one or more sidewalls, said one or more sidewalls comprising at least one aperture for receiving a conductor.

11. The housing according to claim 1, wherein said base is provided with one or more sidewalls, wherein at least one sidewall is provided with an aperture for receiving a device.

12. The housing according to claim 11, wherein said device received within said aperture is said at least one sidewall is a sensor.

13. The housing according to claim 12, wherein said sensor is selected from the group comprising temperature sensors, relative humidity sensors and carbon dioxide sensors.

14. The housing according to claim 1, wherein said base is provided with a pair of sidewalls, each sidewall provided with an aperture for receiving an electrical conductor, said base provided with a pair of posts adjacent to each aperture in said sidewalls for securing said conductors to said base, wherein a pair of said reversible clamp-straps are used to secure said conductors to said base.

15. A system comprising:
at least one controller;
a plurality of devices to be controlled by said controller;
at least one device housing; said device housing comprising:
a base;
an interface for securing a device;
an opening for receiving an electrical conductor, said electrical conductor being operably connected to said device to provide signals between said device and said controller;
a reversible clamp-strap, comprising a first side having a raised surface and a second side, connected to said base for securing said electrical conductor in said housing; wherein said first side of said clamp-strap is used for securing a first type of electrical conductor wherein said clamp-strap is reversible to enable said second side to contact and secure a second type of electrical conductor.

16. The system according to claim 15, wherein at least one of said devices provided in a device housing is a sensor selected from the group comprising temperature sensors, relative humidity sensors and carbon dioxide sensors.

17. The system according to claim 15, wherein said system is a building control system.

18. The system according to claim 15, wherein said base is provided with one or more sidewalls, said one or more sidewalls comprising at least one aperture for receiving a conductor.

19. The system according to claim 15, wherein said base is provided with one or more sidewalls, wherein at least one sidewall is provided with an aperture for receiving a device.

20. The system according to claim 15, wherein said device received within said aperture is said at least one sidewall is a sensor.

21. The system according to claim 15, wherein said base is provided with a pair of sidewalls, each sidewall provided with an aperture for receiving an electrical conductor, said base provided with a pair of posts adjacent to each aperture in said sidewalls for securing said conductors to said base, wherein a pair of said reversible brackets members are used to secure said conductors to said base.

22. A method for securing different types of electrical connectors to a device in a housing, the method comprising:
providing a base capable of receiving an electrical conductor;
providing a reversible clamp-strap comprising a first side having a raid and a second side;
connecting said reversible clamp-strap to said base for securing said electrical conductor to said base and using said first side of said clamp-strap when using a first type of electrical conductor and using said second side of said bracket to enable said second side to contact and secure a second type of electrical conductor; and
connecting a device to said base.

23. The method according to claim 22, further comprising providing a pair of posts on said base for enabling the connection of said clamp-strap to said base.

24. The method according to claim 22, further comprising generating a signal from said device to a controller operatively connected to said electrical conductor.

25. The method according to claim 22, further comprising generating a signal from said device to a conductor indicating the condition of the atmosphere where the device is located.

26. The method according to claim 22, further comprising providing said base with one or more sidewalls provided with apertures for receiving one or more conductors before said one or more conductors are secured to said base.

* * * * *